United States Patent
Calabria et al.

(10) Patent No.: US 8,122,854 B2
(45) Date of Patent: Feb. 28, 2012

(54) CHICKEN-LOADING VEHICLE

(75) Inventors: Paolo Calabria, Palazzolo S/O (IT); Eugenio Calabria, Pilzone D'Iseo (IT)

(73) Assignee: Ciemmecalabria S.R.L., Cazzago S. Martino (BS) (IT)

( * ) Notice: Subject to any disclaimer, the term of this patent is extended or adjusted under 35 U.S.C. 154(b) by 265 days.

(21) Appl. No.: 12/000,832

(22) Filed: Dec. 18, 2007

(65) Prior Publication Data
US 2008/0196677 A1    Aug. 21, 2008

(30) Foreign Application Priority Data

Feb. 21, 2007   (IT) .............................. MI2007A0331

(51) Int. Cl.
A01K 29/00    (2006.01)
B65G 15/00    (2006.01)

(52) U.S. Cl. .......................... 119/846; 119/843; 198/312

(58) Field of Classification Search .......... 119/843–846, 119/401; 198/312, 314; 452/177–179, 183–187, 452/52, 53
See application file for complete search history.

(56) References Cited

U.S. PATENT DOCUMENTS

| | | | | |
|---|---|---|---|---|
| 2,883,030 A * | 4/1959 | Saunders | ...................... | 198/309 |
| 3,420,211 A * | 1/1969 | Hartvickson | ................. | 119/846 |
| 3,672,335 A * | 6/1972 | Sanders | ......................... | 119/846 |
| 4,467,745 A * | 8/1984 | Ledwell et al. | ............... | 119/846 |
| 4,600,351 A * | 7/1986 | Nelson | ........................... | 119/846 |
| 5,385,117 A * | 1/1995 | Hollis et al. | .................. | 119/846 |
| 6,347,604 B1 * | 2/2002 | Lapere et al. | ................. | 119/843 |
| 6,454,510 B1 * | 9/2002 | Sinn et al. | ..................... | 414/393 |
| 6,477,987 B2 * | 11/2002 | Taylor | ........................... | 119/843 |
| 6,616,103 B2 * | 9/2003 | Marrero | ..................... | 244/137.1 |
| 6,976,454 B2 * | 12/2005 | Cattaruzzi | ..................... | 119/846 |
| 7,281,496 B2 | 10/2007 | Calabria et al. | | |
| 2002/0015635 A1 * | 2/2002 | Sinn et al. | ..................... | 414/346 |

FOREIGN PATENT DOCUMENTS

| | | |
|---|---|---|
| EP | 0 713 642 B1 | 10/1997 |
| IT | 1303293 | 11/2000 |
| JP | 60006507 A * | 1/1985 |

* cited by examiner

Primary Examiner — David Parsley
Assistant Examiner — Danielle Clerkley
(74) Attorney, Agent, or Firm — Nixon & Vanderhye, P.C.

(57) ABSTRACT

A fowl-loading vehicle is described, the vehicle comprising: a chassis, wheels or tracks for supporting the chassis relative to the ground; a pick-up conveyor belt for picking up fowl from the ground and a storage conveyor belt which receives fowl from the pick-up conveyor belt and which is movable in the same direction as the pick-up conveyor belt, the speed of the pick-up conveyor belt, during loading of the fowl, being greater than the speed of the storage conveyor belt.

14 Claims, 5 Drawing Sheets

CHICKEN-LOADING VEHICLE

BACKGROUND

I. Field of the Invention

The present invention relates to a vehicle suitable for picking up fowl from the ground, in particular a vehicle suitable for picking up chickens or similar animals.

II. Related Art and Other Considerations

It is well known that most fowl bred for slaughter is currently reared in large sheds or the like. Inside the sheds thousands of birds are reared using very advanced rearing techniques. Intensive rearing methods of this type result in a notable economy of scale for the breeders, in turn resulting in economic advantages for the consumers who purchase cuts of meat obtained from animals reared using these techniques. Moreover, this type of intensive rearing results in a substantial uniformity of the animals reared. After a certain predefined period of time, the reared birds reach the correct weight and are ready for slaughter.

At the end of the rearing period, the live animals must be removed, without causing them injury, from the shed where they have been reared and taken away for the following processing operations, typically taken to the slaughterhouse.

It may also happen that the fowl must be removed from one shed and taken to another shed. This situation arises, for example, when it is required to remove chicks in order to transport them to another location where rearing thereof will be continued.

It is therefore necessary to remove all the animals from the rearing shed in a relatively small amount of time. The removed animals are typically introduced into cages. However, the removed animals may also not be introduced into cages, but taken to another rearing shed or unloaded into a different type of container or onto a conveyor belt.

Once they have been closed inside cages, the animals may be easily transported by means of a lorry or other suitable transportation means. The problem consists, as mentioned above, in the fact that several thousands of birds, for example thousands of chickens, are reared inside the shed and must be removed without causing them injury.

In some countries, in particular in those where the cost of labour is relatively low, the operations of picking up the fowl and if necessary caging them may also be performed manually. This is difficult, time-consuming and often results in injury to the animals. However, in most cases, the picking up (and caging) operations are performed using special machines, commonly called "fowl-loading machines". In the specific case where the fowl are chickens, they are called "chicken-loading machines".

An apparatus for picking up and introducing fowl in general into coops and the like is known, for example, from the Italian patent IT1303293 in the name of Ciemme di Calabria f.lli S.n.c. The known apparatus is very efficient and allows the loading of a very large number of animals per unit of time.

However, in certain working conditions, it is not entirely practical. In particular, the use of such a known apparatus is awkward in rearing sheds which are relatively small and/or which have support pillars arranged close together and/or with small-size entrance doors. Another situation where it is not easy to use the above-mentioned known apparatus is that of multistorey sheds. In fact, in order to work on the higher levels, it is necessary to use light apparatus which have a small height and overall dimensions.

The patent EP0713642 discloses a plant for loading poultry inside containers. In this patent a separate capturing vehicle able to move independently of the plant, for capturing and transporting live poultry into the receiving position is also described. The capturing vehicle according to EP0713642 comprises a tractor and two conveyor units along the sides of the tractor. Each conveyor unit comprises an inclined conveyor and an accumulation conveyor.

The present inventors have considered the problem of providing a chicken-loading vehicle or, more generally, fowl-loading vehicle, which is able to operate in small-size environments and which has a high chicken loading capacity.

BRIEF SUMMARY

According to the technology disclosed herein, a fowl-loading vehicle is provided, said vehicle comprising a chassis, wheels or tracks for supporting the chassis relative to the ground, a pick-up conveyor belt for picking up the fowl from the ground and a storage conveyor belt which receives the fowl from the pick-up conveyor belt and which is movable in the same direction as the pick-up conveyor belt. The speed of the pick-up conveyor belt, during loading of the fowl, is greater than the speed of the storage conveyor belt.

In the present description and in the claims, the term "speed" applied to a conveyor belt (for example the pick-up conveyor belt or the storage conveyor belt) will indicate the length (for example in meters [m]) of conveyor belt which, during operation, travels past per given unit of time (for example one minute [min]). Thus a speed of 20 m/min indicates that in one minute, during operation, twenty meters of belt pass by a fixed point. The present inventors performed speed measurements using a digital tachometer manufactured by the company Borletti, model "digital tachometer t20". This apparatus, or a similar device, may be used to calculate the speed of the conveyor belts.

Preferably, the speed of the pick-up conveyor belt, during loading of the fowl, is at least twice the speed of the storage conveyor belt.

Even more preferably, the speed of the pick-up conveyor belt, during loading of the fowl, is at least three times the speed of the storage conveyor belt.

In one embodiment, the speed of the pick-up conveyor belt, during loading of the fowl, is about four times the speed of the storage conveyor belt. For example, the speed of the pick-up conveyor belt is about 20 m/min and the speed of the storage conveyor belt is about 5 m/min.

Owing to this feature, a much large number of fowl per unit of area may be arranged on the storage conveyor belt. In other words, the density of fowl on the storage conveyor belt is increased considerably. This results in the need to perform fewer journeys to the unloading zone and therefore results in a considerable reduction in the loading time, with direct advantages in terms of loading costs. More compact means able to transport sufficient quantities may also be provided.

Advantageously, the outer surface of the pick-up conveyor belt (i.e. that on which the fowl stand) is rough, i.e. has studs or reliefs projecting from the surface, while the outer surface of the storage conveyor belt is substantially smooth or in any case does not have studs or projecting reliefs. This results in an even greater compaction of the fowl on the storage belt.

Advantageously, the fowl-loading vehicle according to the invention comprises a device for raising the pick-up conveyor belt and the storage conveyor belt so that the vehicle is able to assume a configuration for unloading fowl. In a preferred embodiment, the device in question comprises an oil-hydraulic piston which is fixed to the chassis of the vehicle and is able to raise the storage conveyor belt and, together with it, also the pick-up conveyor belt, keeping it pivotably hinged at the rear of the chassis.

In the fowl unloading configuration, the movement of the conveyor belts is reversed so as to convey the fowl towards the front end. During this operation, the speed of the pick-up conveyor belt and the storage conveyor belt may be substantially the same. Alternatively, the speed may be different, i.e. the speed of the pick-up conveyor belt (which during unloading acts as an unloading conveyor belt) is greater than the speed of the storage conveyor belt. This is advantageous because it prevents overcrowding downstream (inside the cages, inside the containers or the like).

The fowl-loading vehicle, in a preferred embodiment, comprises a driving station which is situated substantially at the front end and is separated from the pick-up conveyor belt so that the entire width of the pick-up conveyor belt may be used. Owing to this driving position, the operator has maximum visibility and the pick-up and unloading operations are facilitated.

According to an advantageous embodiment it is possible to provide a gate which remains open during the fowl loading or pick-up operation and which is closed at the end of the pick-up operation until the operator is able to unload the fowl collected inside containers of the cage type or the like.

BRIEF DESCRIPTION OF THE DRAWINGS

There now follows a detailed description of the invention, provided purely by way of a non-limiting example, to be read with reference to the accompanying illustrations in which.

DETAILED DESCRIPTION

Figure 1:
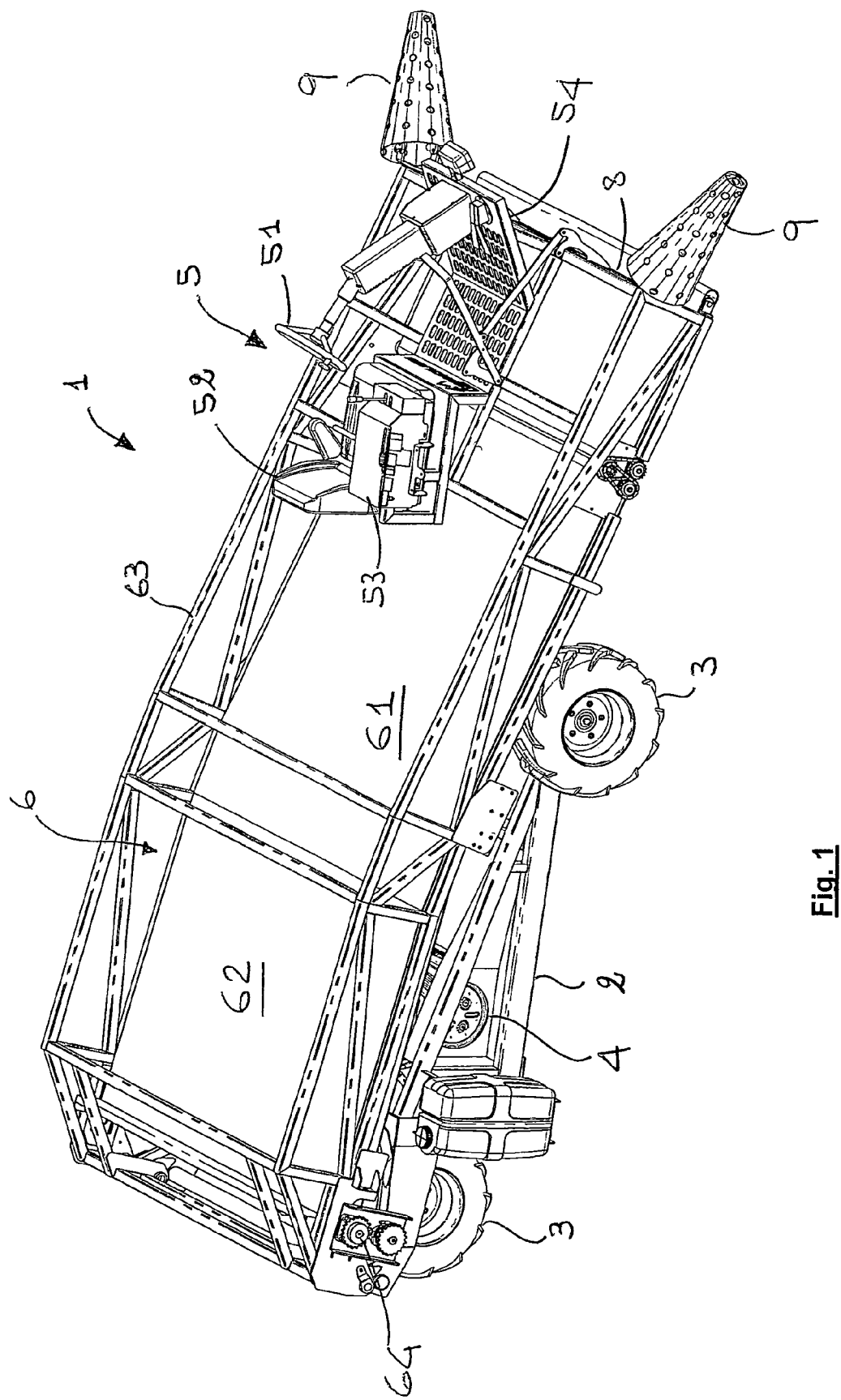
FIG. 1 is an axonometric view of a vehicle according to an example embodiment in a loading configuration.
Figure 2:
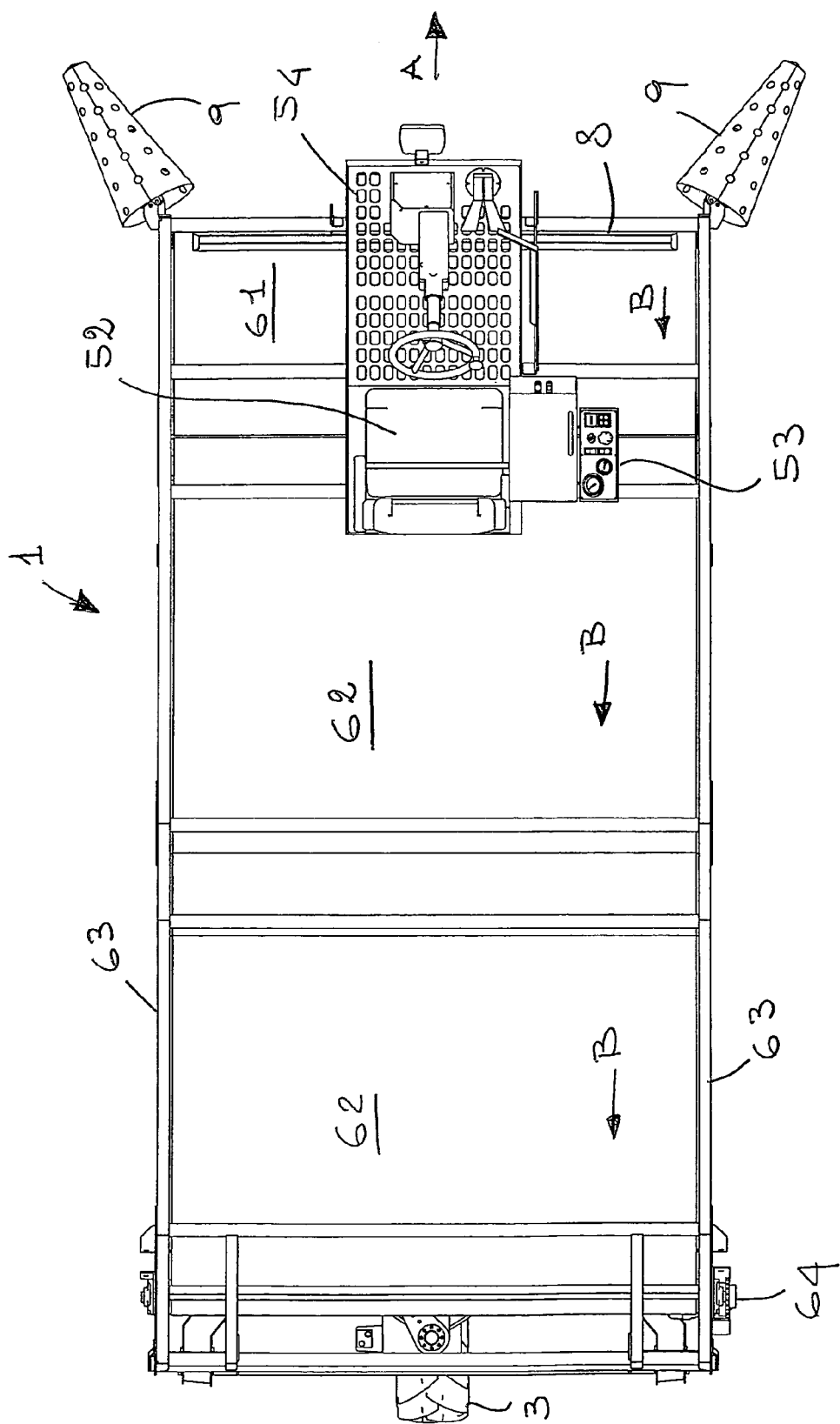
FIG. 2 is a top plan view of the vehicle according to FIG. 1.
Figure 3:
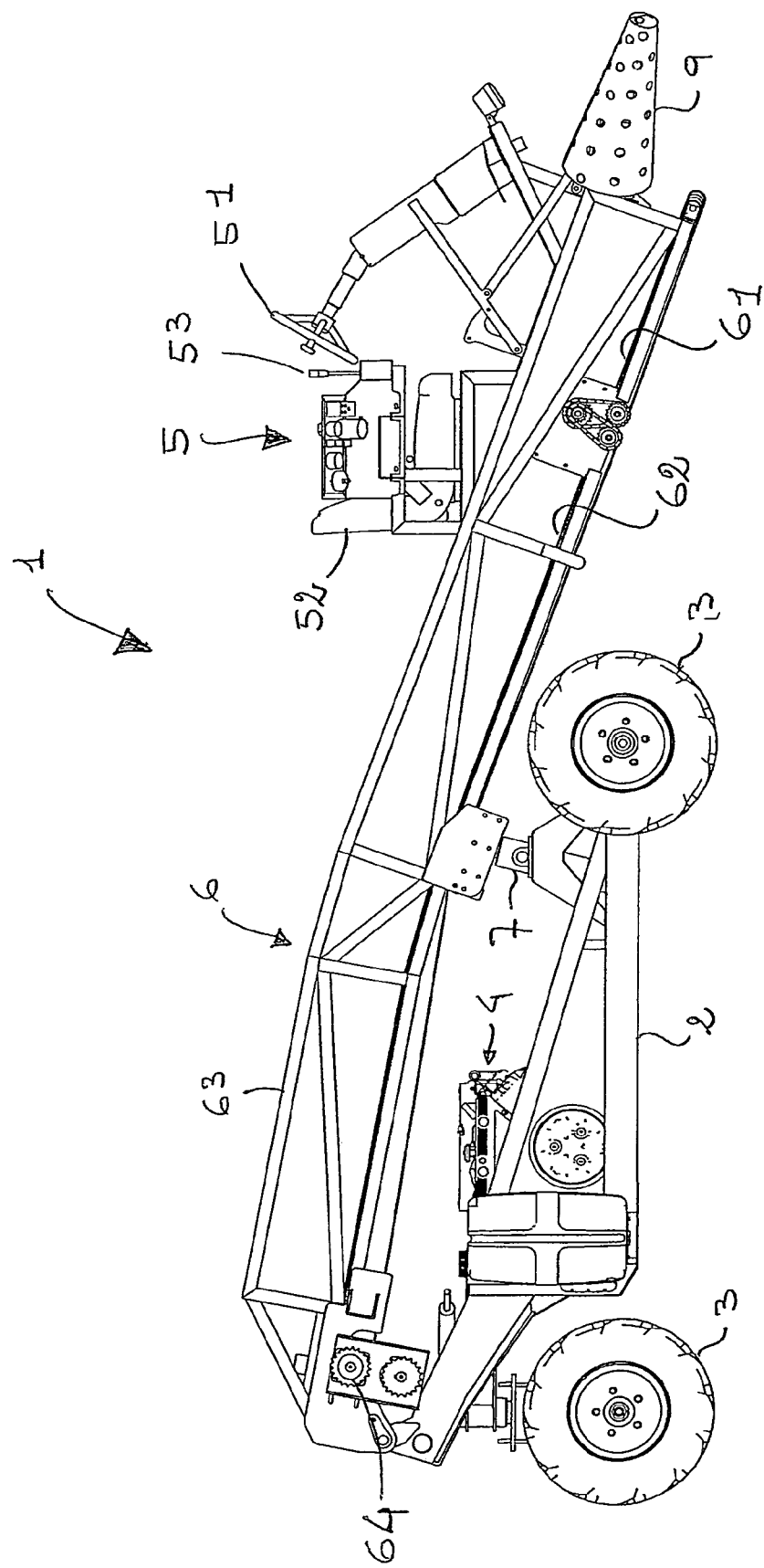
FIG. 3 is a side view of the vehicle according to FIG. 1 in the loading configuration.

Reference should be made firstly to FIGS. 1, 2 and 3 which show an example embodiment of a fowl-loading vehicle 1. By way of a non-limiting example, the fowl which may be loaded using the vehicle 1 are chickens.

The vehicle 1 comprises a main chassis 2. Wheels 3 are fixed to the chassis. In the embodiment shown, the vehicle 1 has three wheels 3. As an alternative to the wheels 3 it is possible to mount tracks. Preferably the vehicle 1 is equipped with its own engine 4 and is therefore able to move autonomously inside the rearing sheds and/or outside of them. Alternatively, the vehicle 1 may not have its own engine and may be coupled to another motorized vehicle such as a tractor or the like (not shown).

Conventionally, there is a transmission mechanism for transferring the movement of the engine 4 to one or more of the wheels 3. There is also a driving station 5 with a steering device 51 for steering the vehicle in the direction desired by the operator. In the embodiment shown, a seat 52 with a steering wheel 51 and other steering controls 53 is provided. These controls 53 are not relevant for the purposes of the technology disclosed herein and will therefore not be further described. The driving station 5 will instead be described in more detail in the continuation of the present description below.

A set of conveyor belts 6 is supported by the main chassis 2. The set of conveyor belts 6 comprises a first pick-up conveyor belt 61 and a second storage conveyor belt 62. The two conveyor belts are aligned. They are supported by a belt support structure. Preferably, the sides of the conveyor belts are provided with lateral shoulders 63 which define a channel or tunnel and which prevent the loaded animals from falling laterally.

The pick-up conveyor belt 61 is situated at the front end of the vehicle 1 and, at least in the loading configuration, is arranged inclined towards the ground. The storage conveyor belt 62 is arranged downstream of the pick-up conveyor belt 61. The term "downstream" refers to the vehicle 1 in the loading configuration. As will be seen below, in the unloading configuration, the storage conveyor belt 62 is situated upstream of the pick-up belt 61.

The pick-up conveyor belt 61 is wound endlessly around at least a first and second roller 61b. In a similar manner, the storage conveyor belt 62 is wound endlessly around at least a first roller 62a and a second roller. The second roller 61b of the pick-up conveyor belt 61 is situated in the vicinity of the first roller 62a of the storage conveyor belt 62.

Figure 4:
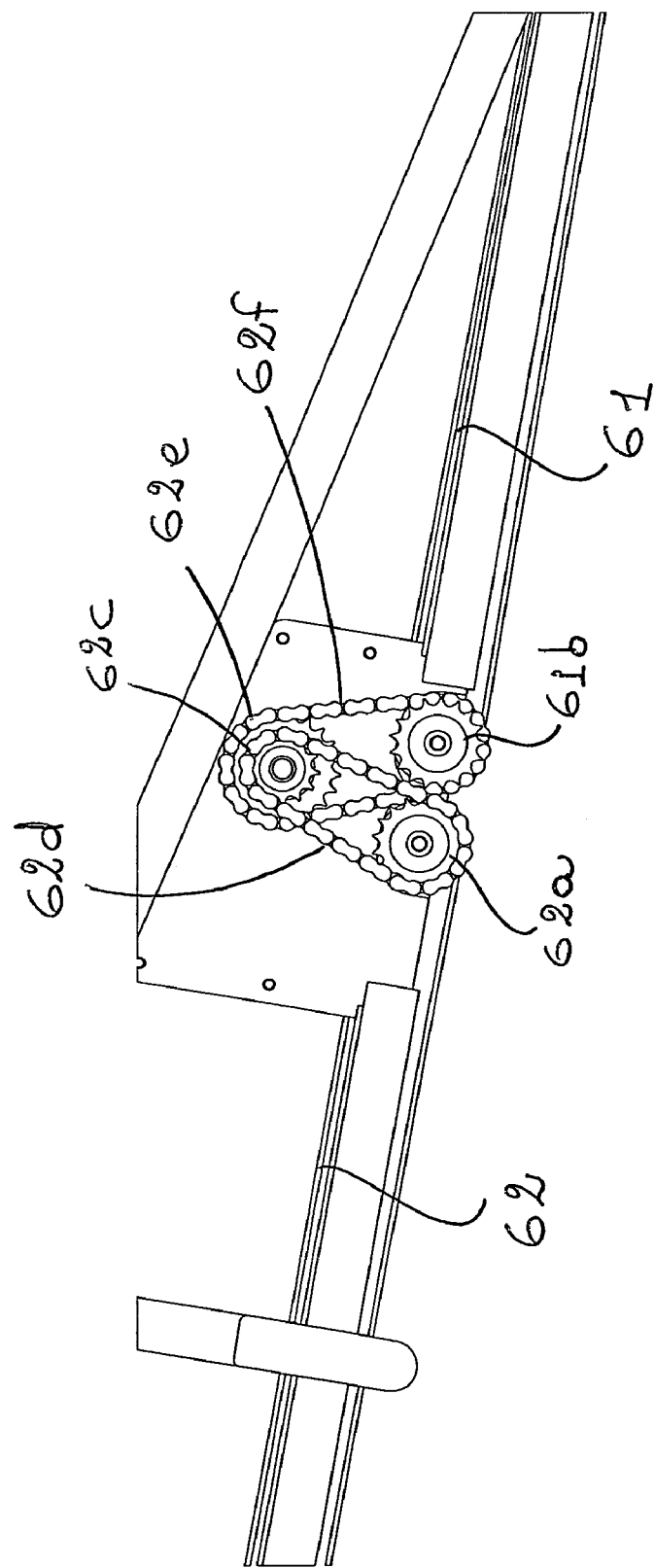
FIG. 4 shows a detail of the vehicle according to FIG. 1.

Preferably, a single hydraulic motor 64 is provided for moving the pick-up conveyor belt 61 and the storage conveyor belt 62. In a preferred embodiment, the hydraulic motor 64 allows rotation of the second roller of the storage conveyor belt 62. The rotation of this roller causes travel of the storage conveyor belt 62 and rotation of the first roller 62a of the storage conveyor belt 62. The latter is advantageously connected to a transmission crown gear 62c (FIG. 4). Typically the connection is performed by means of a chain 62d. Another crown gear 62e is also mounted on the shaft of the transmission crown gear 62c and in turn transmits a rotational movement to the second roller 61b of the pick-up conveyor belt. In this case also, typically connection is performed by means of a chain 62f.

According to the technology disclosed herein, during the loading operation, the speed of the pick-up conveyor belt 61 is greater than the speed of the storage conveyor belt 62. Preferably, the speed of the pick-up conveyor belt 61, during loading of the fowl, is at least twice the speed of the storage conveyor belt 62. More preferably, the speed of the pick-up conveyor belt 61, during loading of the fowl, is at least three times the speed of the storage conveyor belt 62. Even more preferably, the speed of the pick-up conveyor belt 61, during loading of the fowl, is about four times the speed of the storage conveyor belt 62. The inventors consider that a convenient value for the speed of the pick-up conveyor belt 61 is about 20 m/min and a convenient value for the speed of storage conveyor belt 62 is about 5 m/min.

The different speed of the conveyor belts 61, 62 is obtained owing to a different transmission ratio of the crown gears 62c and 62e.

During unloading of the fowl, i.e. the operation performed after picking up, the two conveyor belts 61, 62 are moved at the same speed or at a different speed. Conveniently, during unloading, the speed of the pick-up conveyor belt 61 is greater than that of the storage conveyor belt 62. In an advantageous embodiment, the speed of the pick-up conveyor belt 61 is twice that of the storage conveyor belt 62. According to an advantageous embodiment, said speeds may be about 10 m/min and about 20 m/min.

Advantageously, the surface of the pick-up conveyor belt 61 is "rough", i.e. has studs or reliefs projecting from the surface, while the surface of the storage conveyor belt 62 is substantially smooth or in any case does not have studs or projecting reliefs. Conveniently, the belts are made of PVC or similar material.

Figure 5:
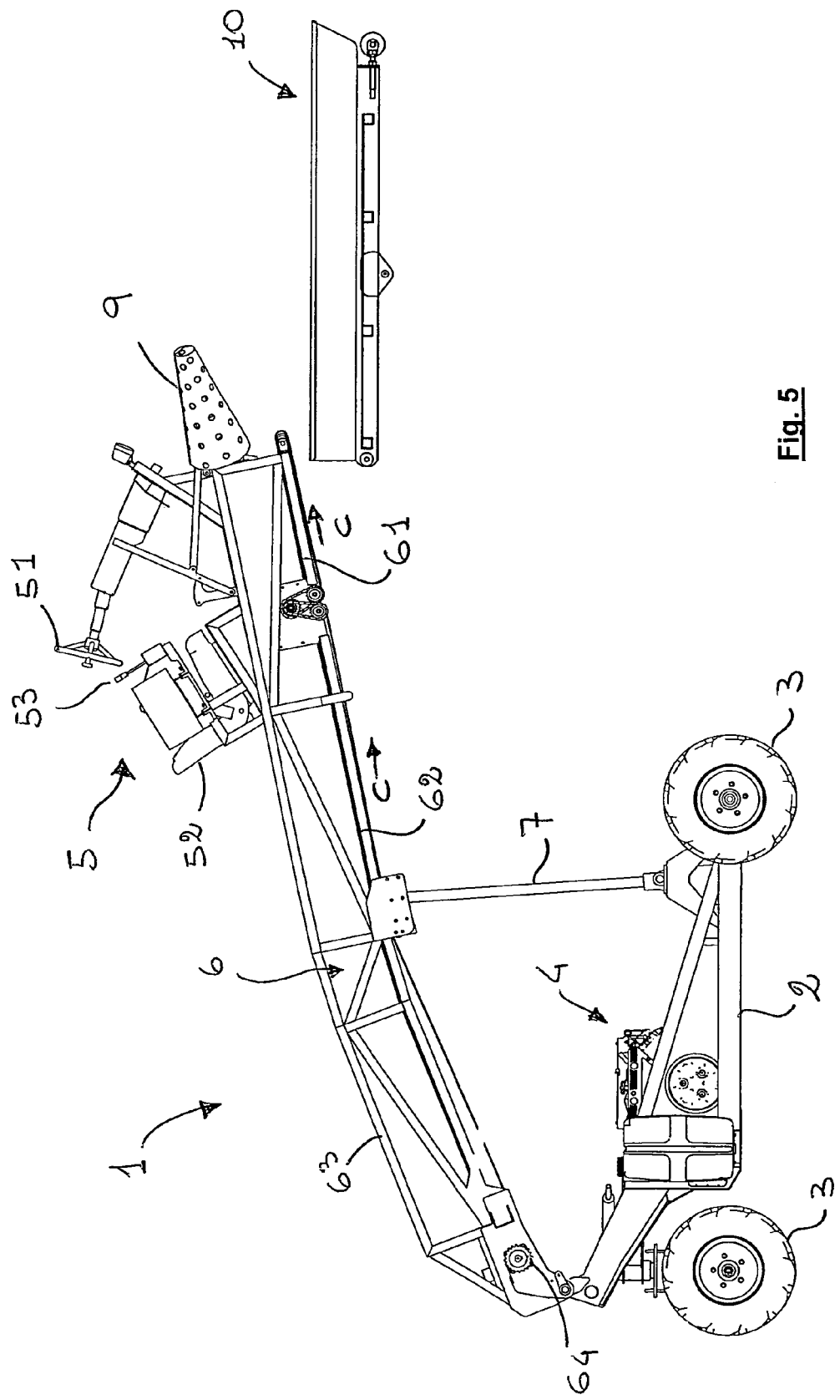
FIG. 5 shows the unloading operations using the vehicle according to FIG. 1.

The conveyor belt support structure may be raised with respect to the chassis 2 of the vehicle. In a preferred and advantageous embodiment, the support structure of the conveyor belts 61, 62 is pivotably hinged at the rear of the vehicle 1 and may be raised by means of an oil-hydraulic piston 7 which is fixed to the chassis 2 of the vehicle 1. The raised position is shown in FIG. 5.

As mentioned above, the vehicle 1 comprises a driving station 5 with a steering wheel 51 or handlebars for steering the vehicle 1 in the direction desired by the operator, a seat 52 and other driving controls 53. The driving station 5 is fixed to a plate 54 which is situated above the pick-up conveyor belt 61. Between the plate 54 and the surface of the pick-up conveyor belt 51 there is preferably a height sufficient for allowing fowl to pass through. In this way, the entire width of the pick-up conveyor belt 61 may be used and the operator has full visibility and control. This is very useful during the operations of both loading and unloading of the fowl.

Among other things, in a preferred example embodiment of the vehicle, a gate or barrier 8 is provided, said gate or barrier remaining open during the operation of loading or picking up the fowl and being closed at the end of the picking-up operation until the operator is able to unload the loaded fowl into containers of the cage type or the like. The gate may be pivotably hinged at the top. The presence of this barrier 8 also allows the loading capacity of the vehicle 1 to be fully exploited.

In one example embodiment, at the front of the vehicle there are two large brushes 9 for guiding better the animals towards the pick-up conveyor belt 61.

The operating principle of the vehicle 1 during loading of the fowl and, subsequently, during transfer and unloading is now described.

The vehicle 1 is brought inside the rearing shed and is moved forwards in the direction A (FIG. 2) with the pick-up conveyor belt 61 close to the ground. During the forward movement of the vehicle 1 both the pick-up conveyor belt 61 and the storage conveyor belt 62 are moving and transport fowl in the direction of the arrow B (FIG. 2). The speed of the first conveyor belt 61 is greater than that of the second conveyor belt 62, as clarified several times above. In this way, the animals picked up from the ground are packed together on the storage belt 62, filling it more or less entirely. When the operator, who is sat in the seat 52 and has a perfect overview, considers that the vehicle 1 has loaded a sufficient number of animals, he/she lowers the gate 8, preventing the loaded animals from escaping.

Once the vehicle has been loaded with fowl, the operator drives off towards the unloading location. During transfer, the belts 61, 62 are preferably at a standstill. Preferably, so that the pick-up conveyor belt 61 does not knock against the rough surface of the ground, the operator raises slightly the belts 61, 62. Upon approaching the unloading point, which may be a conveyor belt (as shown in FIG. 5), a cage or any other container to be filled, the operator opens the barrier 8 and operates the belts 61, 62 so that they transport the fowl in the direction of the arrow G. The fowl thus loaded fall directly from the pick-up conveyor belt 61 into the cages (or into some other container or onto a conveyor belt 10). Depending on the height at which the cages (container or conveyor belt 10) are situated, the conveyor belt unit is raised. Moreover, the operator, who is monitoring closely the unloading operations, may control falling of the fowl by adjusting the speed of the conveyor belts or if necessary reversing slightly with the vehicle. All this is also favoured by the somewhat retracted position of the front wheels with respect to the free end of the pick-up conveyor belt.

Therefore, advantageously, in the vehicle 1, loading and unloading are performed at the front end of the vehicle. On the other hand, the capturing vehicle known from EP 0713642 envisaged front loading and rear loading. The operator drove forwards frontally in order to load the chickens, but had to reverse towards the unloading zone. This was extremely awkward, dangerous and caused several accidents, all the more so because the fowl loading operations are generally performed at night time.

The vehicle according to the technology disclosed herein is very compact in terms of dimensions. This means it may be used in sheds where there is limited space or columns situated close to one another. In one embodiment it has a wheel base of about 200 cm, a wheel track of about 200 cm and overall length of about 350 cm. It is also fairly light (about 800 kg or in any case between 500 kg and 1000 kg) and this allows it to be used in multistorey sheds, if necessary with wooden floors.

The invention claimed is:

1. A fowl-loading vehicle comprising:
a chassis;
wheels or tracks for supporting the chassis relative to the ground;
a pick-up conveyor belt configured to pick up fowl from the ground;
a storage conveyor belt configured to receive the fowl from the pick-up conveyor belt and which is movable in a same direction as the pick-up conveyor belt,
a belt support structure which is configured to support the pick-up conveyor belt and the storage conveyor belt, wherein said belt support structure is pivotably hinged to the chassis at rear of the vehicle;
a device for raising said belt support structure, whereby the end of the vehicle at which the fowl are loaded can be near ground for a foul loading operation and can be selectively elevated for a fowl unloading operation;
means for reversing direction of movement of the conveyor belts during unloading of the fowl, so as to convey the fowl in a direction opposite to a pick-up direction whereby the fowl are both loaded and unloaded at a same end of the vehicle,
a driving station which is fixed to a plate, said plate being at a height sufficient for allowing fowl to be conveyed by said belts under the plate, wherein said driving station is connected to the belt support structure so that said height remains unchanged during loading and unloading of the vehicle; and
a gate arranged at a front side of the vehicle, wherein said gate is configured to remain open during the fowl loading operation; to remain closed at the end of the fowl loading operation until an operator is able to unload the fowl collected inside containers, whereby fowl are collected and stored both on said storage conveyor belt and on said pick-up conveyor belt before said fowl are unloaded; and to remain open during a fowl unloading operation.

2. The vehicle according to claim 1, wherein the driving station configured to orient an operator toward the end of the vehicle from which the fowl are both loaded and unloaded.

3. The vehicle of claim 1, wherein a speed of the pick-up conveyor belt, during loading of the fowl, is higher than a speed of the storage conveyor belt.

4. The vehicle of claim 1, wherein a speed of the pick-up conveyor belt, during unloading of the fowl, is higher than a speed of the storage conveyor belt.

5. The vehicle of claim 1, wherein an outer surface of the pick-up conveyor belt is rough and an outer surface of the storage conveyor belt is smooth.

6. The vehicle of claim 1, wherein said gate is hinged at the top.

7. The vehicle of claim 1, wherein the vehicle further comprises a hydraulic motor which is configured to move said pick-up conveyor belt and said storage conveyor belt.

8. The vehicle of claim 1, wherein said wheels comprise at least one front wheel, wherein said at least one front wheel is arranged retracted with respect to a front end of said pick-up conveyor belt.

9. The vehicle of claim 1, wherein said wheels comprise at least one front wheel, wherein said at least one front wheel is arranged retracted with respect to a front end of said storage conveyor belt.

10. The vehicle of claim 1, wherein said wheels comprise two front wheels and one single rear wheel.

11. The vehicle of claim 1, wherein the gate is arranged at a front end of the pickup conveyor belt.

12. A method for transporting fowl, the method comprising:

providing a vehicle having a pick-up conveyor belt and a storage conveyor belt, the storage conveyor belt being movable in same direction as the pick-up conveyor belt;

operating said pick-up conveyor belt and said storage conveyor belt in a fowl loading direction for picking fowl from the ground; and then;

operating said pick-up conveyor belt and said storage conveyor belt in a fowl unloading direction which is opposite to the loading direction;

positioning an end of the vehicle at which the fowl are loaded near ground for a loading operation and selectively elevating the end of the vehicle for an unloading operation;

wherein speed of the pick-up conveyor belt, during loading of the fowl, is greater than the speed of the storage conveyor belt; and further comprising operating a gate arranged at a front end of the pickup conveyor belt by:

open the gate during a fowl loading operation;

closing the gate at the end of the fold loading operation, whereby the fowl are collected and stored both on said storage conveyor belt and on said pick-up conveyor belt before said fowl are unloaded; and opening the gate during a fowl unloading operation.

13. The method according to claim 12, wherein the speed of the pick-up conveyor belt, during loading of the fowl, is at least twice the speed of the storage conveyor belt.

14. The method according to claim 12, further comprising operating said pick-up conveyor belt and said storage conveyor belt in the fowl loading direction for picking up fowl when the pick-up conveyor belt is in a ground proximate position;

elevating the pick-up conveyor belt and said storage conveyor belt for operating said pick-up conveyor belt and said storage conveyor belt in the fowl unloading direction whereby the fowl are unloaded from an above-ground elevation.

* * * * *